(12) United States Patent
Nakatani

(10) Patent No.: US 12,092,720 B2
(45) Date of Patent: Sep. 17, 2024

(54) RADAR SIGNAL PROCESSING DEVICE, RADAR DEVICE, RADAR SIGNAL PROCESSING METHOD AND NON-TRANSITORY COMPUTER-READABLE MEDIUM

(71) Applicant: FURUNO ELECTRIC CO., LTD., Hyogo (JP)

(72) Inventor: Fumiya Nakatani, Toyonaka (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 304 days.

(21) Appl. No.: 17/564,184

(22) Filed: Dec. 28, 2021

(65) Prior Publication Data

US 2022/0252710 A1    Aug. 11, 2022

(30) Foreign Application Priority Data

Feb. 8, 2021   (JP) .................................. 2021-017895

(51) Int. Cl.
*G01S 13/32*  (2006.01)
*G01S 7/04*  (2006.01)
*G01S 13/89*  (2006.01)
*G01S 13/937*  (2020.01)

(52) U.S. Cl.
CPC .............. *G01S 13/32* (2013.01); *G01S 7/04* (2013.01); *G01S 13/89* (2013.01); *G01S 13/937* (2020.01)

(58) Field of Classification Search
CPC ....................................................... G01S 13/32
See application file for complete search history.

(56) References Cited

U.S. PATENT DOCUMENTS

| | | | | |
|---|---|---|---|---|
| 4,392,137 | A | * | 7/1983 | Intlekofer ................. G01S 7/12 345/157 |
| 9,442,191 | B2 | | 9/2016 | Corbett et al. |
| 2007/0040728 | A1 | * | 2/2007 | Nishimura ............ G01S 13/426 342/107 |
| 2016/0029968 | A1 | * | 2/2016 | Lerner ................... A61B 5/725 600/595 |
| 2017/0168153 | A1 | | 6/2017 | Kozuki et al. |
| 2019/0369221 | A1 | | 12/2019 | Umehira et al. |

OTHER PUBLICATIONS

"Search Report of Europe Counterpart Application", issued on Jul. 5, 2022, p. 1-p. 7.

* cited by examiner

*Primary Examiner* — Vladimir Magloire
*Assistant Examiner* — Eric K Hodac
(74) *Attorney, Agent, or Firm* — JCIPRNET

(57) ABSTRACT

A radar signal processing device is provided. The radar device may include processing circuitry. The processing circuitry is configured to generate a processing signal based on a beat signal of a transmission signal and a reception signal, and generate a plurality of extracted beat signals by applying a plurality of window functions on the processing signal, and convert the plurality of extracted beat signals to amplitude data indicating a relationship between a distance and an amplitude, and integrate a plurality of the amplitude data into integrated data.

11 Claims, 12 Drawing Sheets

RADAR SIGNAL PROCESSING DEVICE, RADAR DEVICE, RADAR SIGNAL PROCESSING METHOD AND NON-TRANSITORY COMPUTER-READABLE MEDIUM

CROSS-REFERENCE TO RELATED APPLICATION

This application claims the priority benefit of Japan application serial No. 2021-017895, filed on Feb. 8, 2021. The entirety of the above-mentioned patent application is hereby incorporated by reference herein and made a part of this specification.

TECHNICAL FIELD

The disclosure relates to a radar signal processing device, a radar device, a radar signal processing method, and a non-transitory computer-readable medium for radar signal processing.

BACKGROUND

There has conventionally been known a technique of removing interference waves from a beat signal. For example, Patent Document 1 (U.S. Pat. No. 9,442,191) discloses a radar system as follows. That is, in the radar system, in each of a first signal processing path and a second signal processing path that are signal processing circuits parallel to each other, interference is removed from a copy of a beat signal, at least one window function is selected from multiple window functions having different frequency responses and is applied to the beat signal, and the beat signal is transformed from the time domain to the frequency domain. The radar system combines the output of the first signal processing path with the output of the second signal processing path and generates an output beat signal. Here, in each of the first signal processing path and the second signal processing path in the radar system, an interference removal method and a window function different from those of other parallel signal processing paths are applied.

Patent Document 1: U.S. Pat. No. 9,442,191

In the technique described in Patent Document 1, due to the removal of interference waves from the beat signal, a range side lobe in a power spectrum generated based on the beat signal may increase, and a target may not be able to be accurately detected. There is a desire for a technique that surpasses the technique described in Patent Document 1 and is capable of relatively accurately detecting a target based on a beat signal.

SUMMARY

The purpose of the disclosure relates to a radar signal processing device, a radar device, a radar signal processing method, and a radar signal processing program capable of relatively accurately detecting a target based on a beat signal.

A radar signal processing device is provided. The radar signal processing device includes processing circuitry. The processing circuitry is configured to generate a processing signal based on a beat signal of a transmission signal and a reception signal, generate a plurality of extracted beat signals by applying a plurality of window functions on the processing signal, convert the plurality of extracted beat signals to amplitude data indicating a relationship between a distance and an amplitude, and integrate a plurality of the amplitude data into integrated data.

In this way, by the configuration to generate multiple extracted beat signals extracted based on multiple different time ranges from the processing signal based on the beat signal, convert the extracted beat signals respectively to the amplitude data, and generate the integrated data in which multiple amplitude data are integrated, the integrated data can be generated using the amplitude data based on the extracted beat signal that does not include a beat signal whose amplitude is replaced with zero in order to remove, for example, an interference component. Thus, an increase in range side lobe in the integrated data due to the amplitude of some beat signals being replaced with zero can be suppressed, and a target can be relatively accurately detected based on the integrated data having a small range side lobe. Therefore, the target can be relatively accurately detected based on the beat signal.

According to the disclosure, a target can be relatively accurately detected based on a beat signal.

The processing circuitry may be further configured to select the amplitude of one of the plurality of amplitude data for each of the distance into the integrated data.

A first window function and a second window function of the plurality of window functions may not overlap in time.

A third window function of the plurality of window functions overlaps at least one of the first window function and the second window function.

The plurality of window functions have a same type.

A radar device is provided. The radar device may include the radar signal processing device, a transmitter, and a receiver. The transmitter transmits the transmission signal. The receiver receives a reflected signal reflected by a target.

The transmitter may transmit the transmission signal via a rotating antenna. The receiver may receive the reflected signal via a rotating antenna.

A radar signal processing method, and a non-transitory computer-readable medium having stored thereon computer-executable instructions which, when executed by a computer, cause the computer to execute the following processing, may be provided.

The method and the instructions may include generating a processing signal based on a beat signal of a transmission signal and a reception signal, generating a plurality of extracted beat signals by applying a plurality of window functions on the processing signal, converting the plurality of extracted beat signals to amplitude data indicating a relationship between a distance and an amplitude, and integrating a plurality of the amplitude data into integrated data.

DETAILED DESCRIPTION

Figure 1:
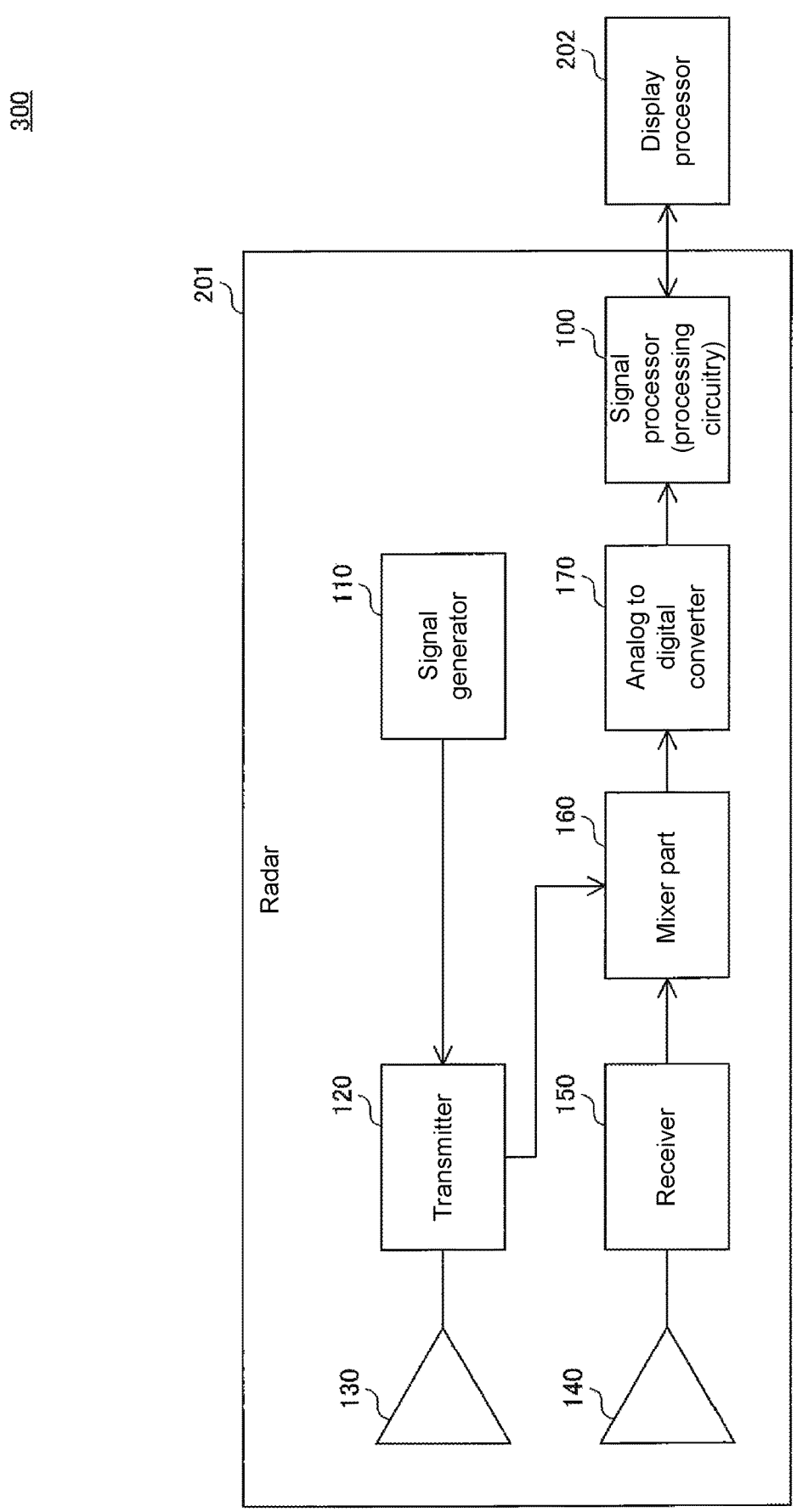
FIG. 1 illustrates a configuration of a radar device according to an embodiment of the disclosure.

Hereinafter, embodiments of the disclosure are described with reference to the drawings. The same or equivalent portions in the drawings are assigned with the same reference numerals and description thereof will not be repeated. In addition, at least some of the embodiments described below may be arbitrarily combined.

[Configuration and Basic Operation]

<Radar Device>

FIG. 1 illustrates a configuration of a radar device according to an embodiment of the disclosure.

Referring to FIG. 1, a radar device 300 includes a radar 201 and a display processor 202. The radar 201 includes a signal generator 110, a transmitter 120, a transmitting antenna 130, a receiving antenna 140, a receiver 150, a mixer part 160, an analog to digital (A/D) converter 170, and a signal processor 100 (which is also referred to as processing circuitry). The signal processor 100 is an example of a radar signal processing device. For example, the radar device 300 is a frequency modulated continuous wave (FM-CW) radar device and is mounted on a ship. The radar device 300 may perform processing configured to display, on a display device (not shown), an echo image indicating the presence or absence of a target in a detection target area being a domain monitored by the ship as well as a distance between the radar device 300 and the target.

The radar 201 may output, to the display processor 202, echo data indicating a detection result of the target in a divided target area being a domain obtained by dividing the detection target area into multiple domains. The transmitting antenna 130 and the receiving antenna 140 may rotate so that an azimuth angle in a radio wave radiation direction of the transmitting antenna 130 changes by a particular angle every particular sweep period T. The radar 201 may output, to the display processor 202, the echo data in multiple divided target areas for each sweep period T.

The display processor 202 may perform processing configured to display the echo image in the detection target area on the display device based on multiple echo data received from the radar 201.

<Radar>

The signal generator 110 may repeatedly generate an analog signal of a particular pattern and output the same to the transmitter 120. More specifically, in the sweep period T, the signal generator 110 may output, to the transmitter 120, an analog signal generated by a modulation method such as an FM-CW method and having a frequency increasing by a particular amount per unit time. Specifically, for example, the signal generator 110 includes a voltage generator and a voltage-controlled oscillator (VCO). In the sweep period T, the voltage generator may generate an FM modulated voltage having a magnitude increasing at a constant rate and output the same to the VCO. The VCO may generate an analog signal having a frequency corresponding to the magnitude of the FM modulated voltage received from the voltage generator and output the same to the transmitter 120.

The transmitter 120 may transmit a transmission signal. More specifically, in the sweep period T, the transmitter 120 may generate a transmission signal of a radio frequency (RF) band based on the analog signal received from the signal generator 110, and output the generated transmission signal of the RF band to the divided target area via the transmitting antenna 130 that rotates with rotation of the radar 201. The transmitter 120 may output the generated transmission signal of the RF band to the mixer part 160. Specifically, for example, the transmitter 120 includes a mixer and a power amplifier. This mixer may generate the transmission signal of the RF band based on the analog signal received from the signal generator 110, and output the generated transmission signal to the power amplifier and the mixer part 160. In the transmitter 120, the power amplifier may amplify the transmission signal received from the mixer, and output the amplified transmission signal to the divided target area via the transmitting antenna 130.

The receiver 150 may receive a reflected signal obtained by reflecting the transmission signal by the target. More specifically, the receiver 150 may receive a reflected signal of the RF band via the receiving antenna 140 that rotates with rotation of the radar 201. The reflected signal of the RF band is obtained by reflecting the transmission signal transmitted from the transmitting antenna 130 by the target in the divided target area. The receiver 150 may also receive, via the receiving antenna 140, an interference wave transmitted by an interfering object. The interfering object is, for example, a pulse radar device located in the divided target area or outside the divided target area. The receiver 150 may output a signal received via the receiving antenna 140 to the mixer part 160. Specifically, for example, the receiver 150 includes a low noise amplifier. The low noise amplifier may amplify a reception signal of the RF band received via the receiving antenna 140, and output the amplified reception signal to the mixer part 160.

The mixer part 160 may generate a beat signal of the transmission signal transmitted from the radar device 300 and the reception signal received by the radar device 300. Here, the beat signal is a signal having a frequency component of a difference between a frequency component of the transmission signal transmitted by the transmitter 120 and a frequency component of the reception signal received by the receiver 150. More specifically, the mixer part 160 includes, for example, two mixers. A branch part (not shown) may branch the transmission signal output from the transmitter 120 and apply a phase difference of 90° to the transmission signals obtained by branching, and output the same to each mixer in the mixer part 160. The branch part (not shown) may branch the reception signal output from the receiver 150 and output the same to each mixer in the mixer part 160. The two mixers in the mixer part 160 may respectively multiply the transmission signals and reception signals, thereby generating an analog beat signal SA composed of a pair of an I signal Si and a Q signal Sq and outputting the same to the A/D converter 170.

The A/D converter 170 may convert the analog beat signal SA received from the mixer part 160 to a beat signal SD being a digital signal composed of a pair of the I signal Si and the Q signal Sq. More specifically, the A/D converter 170 may perform sampling at a particular sampling frequency every sweep period T, thereby generating N beat signals SD composed of pairs of N I signals Si and N Q signals Sq and outputting the same to the signal processor 100. N is an integer equal to or greater than 2.

The signal processor 100 may process the N beat signals SD received from the A/D converter 170 in each sweep period T, thereby generating the echo data indicating the detection result of the target in the divided target area for each sweep period T. The signal processor 100 may output the generated echo data to the display processor 202. Hereinafter, the beat signal SD received by the signal processor 100 from the A/D converter 170 in the sweep signal T and having a sample number n is also referred to as a beat signal SD(n). n is an integer equal to or greater than 1 and equal to or less than N, and corresponds to an elapsed time from the start of the sweep period T. The beat signal SD(n) is a signal composed of a pair of an I signal Si(n) having the sample number n and a Q signal Sq(n) having the sample number n.

The radar device 300 may be configured to include, instead of the transmitting antenna 130 and the receiving antenna 140, one antenna that functions as the transmitting antenna 130 and the receiving antenna 140. In this case, for example, the transmitter 120 may transmit the transmission signal to the transmitting antenna 130 via a circulator. For example, the receiver 150 may receive the reception signal from the receiving antenna 140 via the circulator.

<Display Processor>

The display processor 202 may, based on the echo data for each divided target area that is received from the signal processor 100, generate integrated data being the echo data in the detection target area, and may, based on the generated integrated data, perform the processing configured to display the echo image in the detection target area on the display device (not shown).

<Signal Processor>

Figure 2:
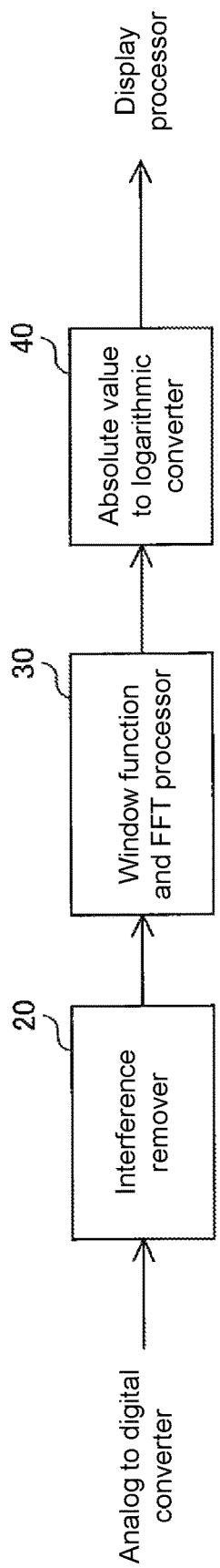
FIG. 2 illustrates a configuration of a signal processor in a radar device according to an embodiment of the disclosure.

FIG. 2 illustrates a configuration of a signal processor in a radar device according to an embodiment of the disclosure. Referring to FIG. 2, the signal processor 100 includes an interference remover 20, a window function and fast Fourier transform (FFT) processor 30, and an absolute value to logarithmic converter 40.

The interference remover 20 may receive N beat signals SD from the A/D converter 170, and perform FFT preprocessing configured to remove an interference component (a component based on an interference wave) from components of the received beat signal SD every sweep period T. For example, in the FFT preprocessing, if the beat signal SD(n) including an interference wave is detected, the interference remover 20 may remove the interference component by replacing the amplitude of the I signal Si(n) and Q signal Sq(n) in the beat signal SD(n) including the interference wave with zero. The interference remover 20 may output the beat signal SD(n) after the FFT preprocessing to the window function and FFT processor 30.

The window function and FFT processor 30 may perform window function processing configured to multiply the N beat signals SD(n) after the FFT preprocessing that are received from the interference remover 20 by a particular window function and perform processing such as FFT processing on the beat signal SD(n) after the window function processing, thereby generating the integrated data DI every sweep period T. The window function and FFT processor 30 may output the generated integrated data DI to the absolute value to logarithmic converter 40. The window function processing and FFT processing performed by the window function and FFT processor 30 will be described in detail later.

The absolute value to logarithmic converter 40 may generate the echo data by logarithmic transformation of an absolute value of the integrated data DI received from the window function and FFT processor 30, and output the generated echo data to the display processor 202.

<Window Function and FFT Processor>

Figure 3:
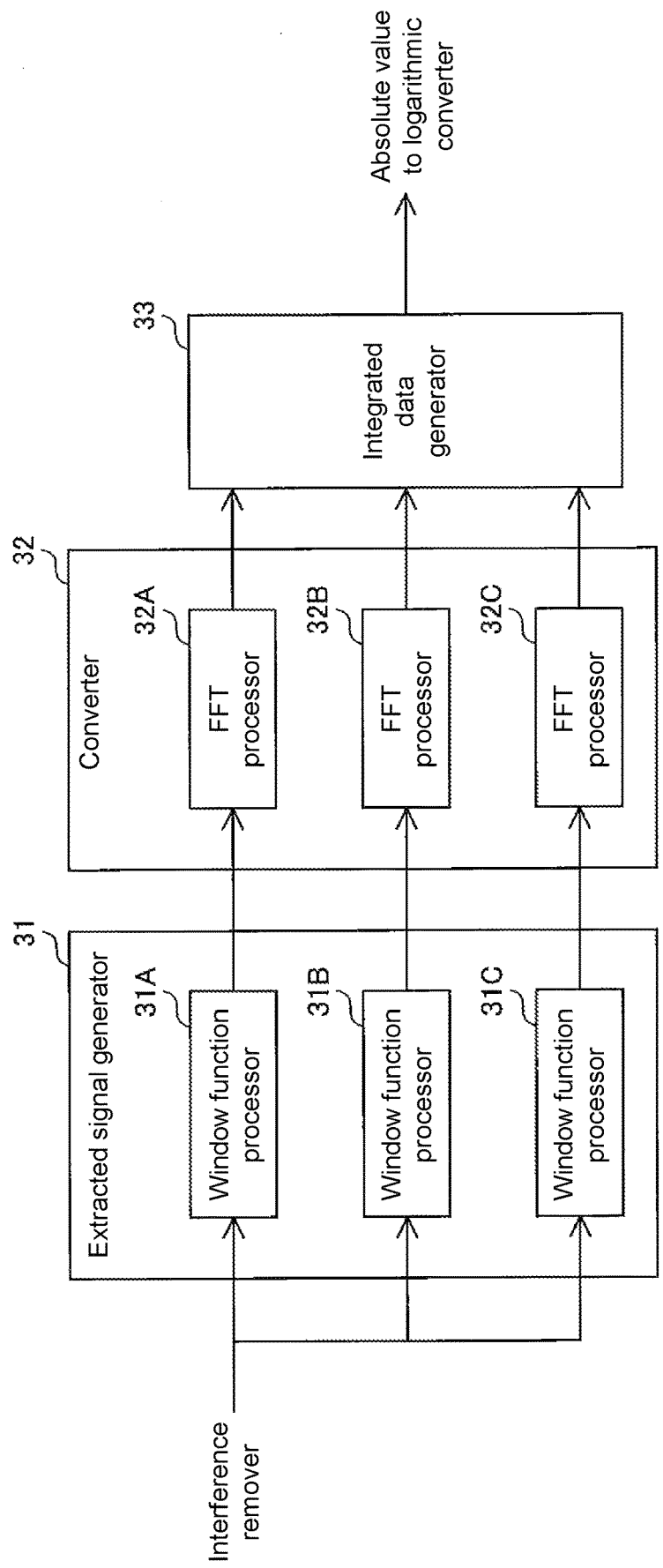
FIG. 3 illustrates a configuration of a window function and FFT processor in a signal processor according to an embodiment of the disclosure.

FIG. 3 illustrates a configuration of a window function and FFT processor in a signal processor according to an embodiment of the disclosure. Referring to FIG. 3, the window function and FFT processor 30 includes an extracted signal generator 31, a converter 32, and an integrated data generator 33. The extracted signal generator 31 includes window function processors 31A, 31B, and 31C. The converter 32 includes FFT processors 32A, 32B, and 32C.

(Extracted Signal Generator)

The extracted signal generator 31 may generate, from a processing signal generated based on a beat signal, multiple extracted beat signals E extracted based on multiple different time ranges. For example, based on the beat signal SD(n) of a target time domain Ta, the extracted signal generator 31 may generate multiple extracted beat signals E respectively based on the beat signals SD(n) in multiple time ranges different from each other in the target time domain Ta. The beat signal SD(n) of the target time domain Ta is an example of the processing signal.

More specifically, each of the window function processors 31A, 31B, and 31C may receive the beat signal SD(n) from the interference remover 20, and, based on the beat signal SD(n) of a particular target time domain Ta, which is some or all of the received beat signals SD(n), generate the extracted beat signal E. As an example, each of the window function processors 31A, 31B, and 31C may, based on the beat signal SD(n) of the target time domain Ta, which is all of the N beat signals SD(n) received from the interference remover 20, generate the extracted beat signal E composed of a pair of an extracted I signal Ei and an extracted Q signal Eq.

Here, the window function processors 31A, 31B and 31C may receive from the interference remover 20, as the beat signal SD(n) from which the interference component has been removed, for example, the beat signal SD(n) in which the amplitude of some of the I signals Si(n) and Q signals Sq(n) are replaced with zero.

Figure 4:
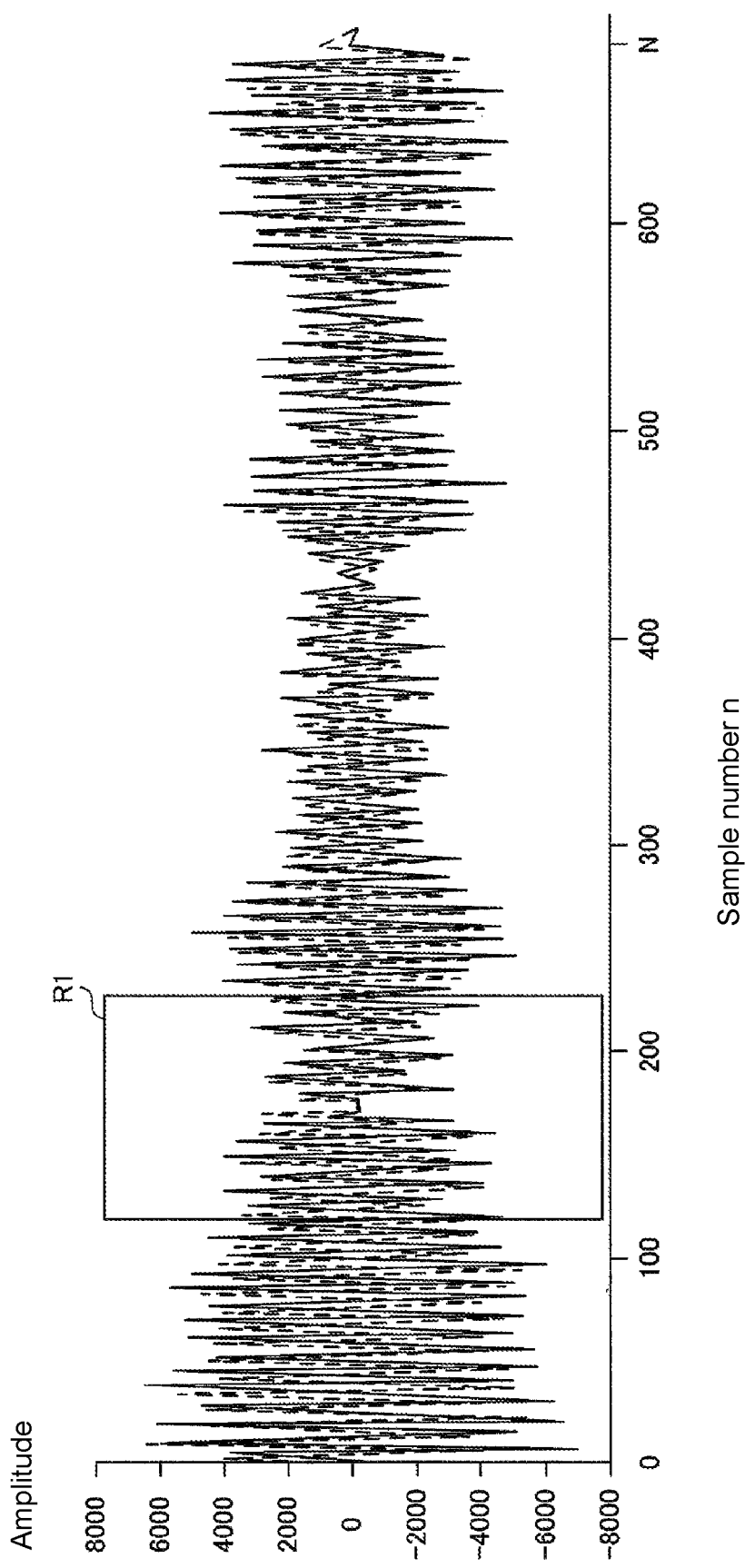
FIG. 4 illustrates an example of a beat signal received from an interference remover by a window function and FFT processor in a signal processor according to an embodiment of the disclosure.
Figure 5:
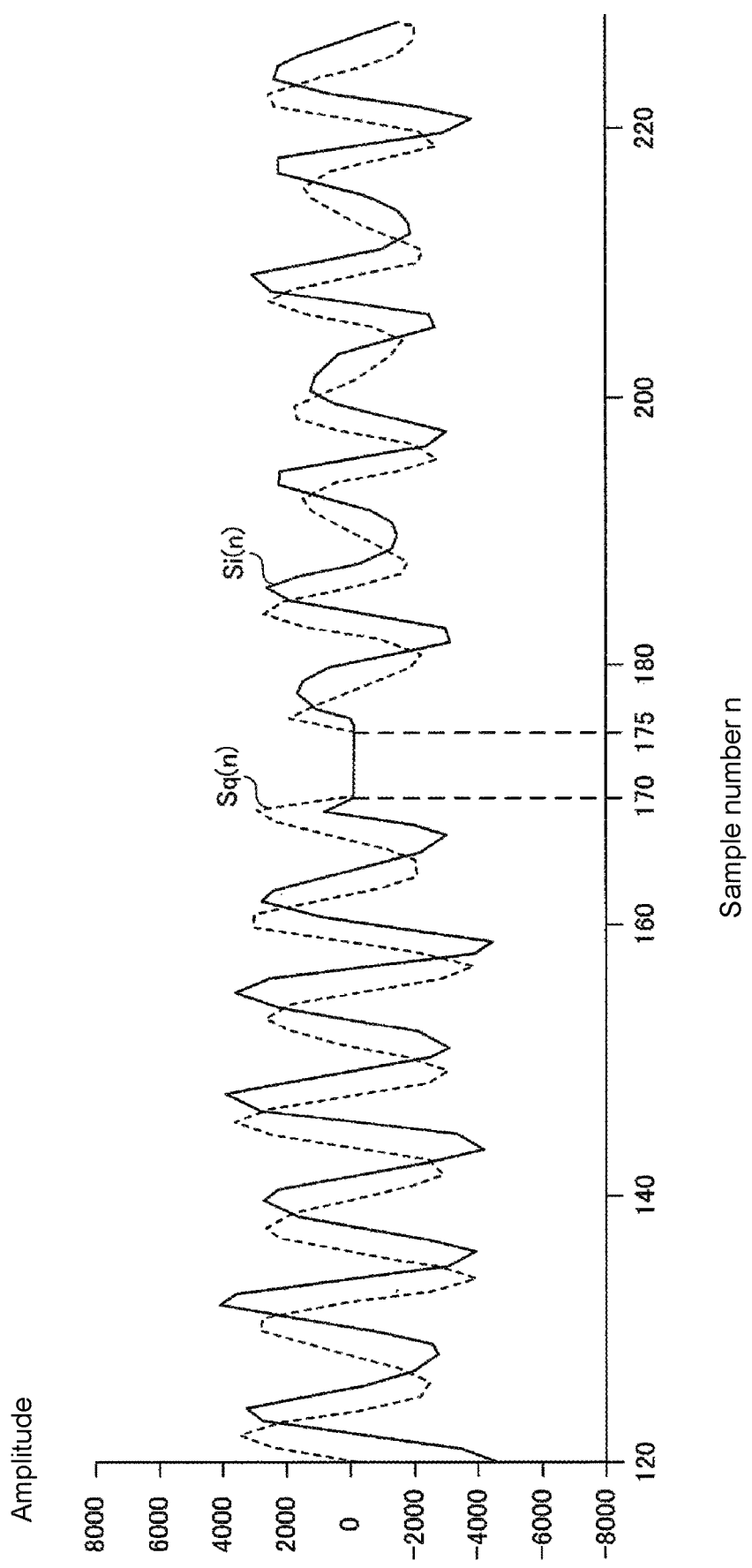
FIG. 5 illustrates an example of a beat signal received from an interference remover by a window function and FFT processor in a signal processor according to an embodiment of the disclosure.

FIG. 4 and FIG. 5 illustrate an example of a beat signal received from an interference remover by a window function and FFT processor in a signal processor according to an embodiment of the disclosure. FIG. 5 is an enlarged view of a region R1 in FIG. 4. In FIG. 4 and FIG. 5, the horizontal axis indicates the value of the sample number n of the beat signal SD(n), and the vertical axis indicates amplitude. The solid line in FIG. 4 and FIG. 5 indicates the I signal Si(n) in the beat signal SD(n). The broken line in FIG. 4 and FIG. 5 indicates the Q signal Sq(n) in the beat signal SD(n).

Referring to FIG. 4 and FIG. 5, as an example, the window function processors 31A, 31B, and 31C may receive from the interference remover 20, the beat signal SD(n) in which the amplitude of the I signal Si(n) and Q signal Sq(n) having the sample number n of 170 to 175 is replaced with zero.

For example, the window function processors 31A, 31B, and 31C may perform the window function processing on the beat signal SD(n) received from the interference remover 20. Each of the window function processors 31A, 31B and 31C may generate multiple extracted beat signals E from the beat signal SD(n) by multiplying multiple window functions Wf different in pass time domain. That is, in the window function processing, each of the window function processors 31A, 31B, and 31C may generate the extracted beat signal E by multiplying the N beat signals SD(n) received from the interference remover 20 by the window functions Wf different from each other in pass time domain TP (a time domain serving as a pass band).

More specifically, the window function processor 31A may multiply the I signal Si(n) and Q signal Sq(n) in the beat signal SD(n) by a window function WfA (which is also referred to as a third window function), thereby generating an extracted beat signal EA being the extracted beat signal E composed of a pair of an extracted I signal EiA and an extracted Q signal EqA.

The window function processor 31B may multiply the I signal Si(n) and Q signal Sq(n) in the beat signal SD(n) by a window function WfB (which is also referred to as a first window function), thereby generating an extracted beat signal EB being the extracted beat signal E composed of a pair of an extracted I signal EiB and an extracted Q signal EqB.

The window function processor 31C may multiply the I signal Si(n) and Q signal Sq(n) in the beat signal SD(n) by a window function WfC (which is also referred to as a second window function), thereby generating an extracted beat signal EC being the extracted beat signal E composed of a pair of an extracted I signal EiC and an extracted Q signal EqC.

Figure 6:
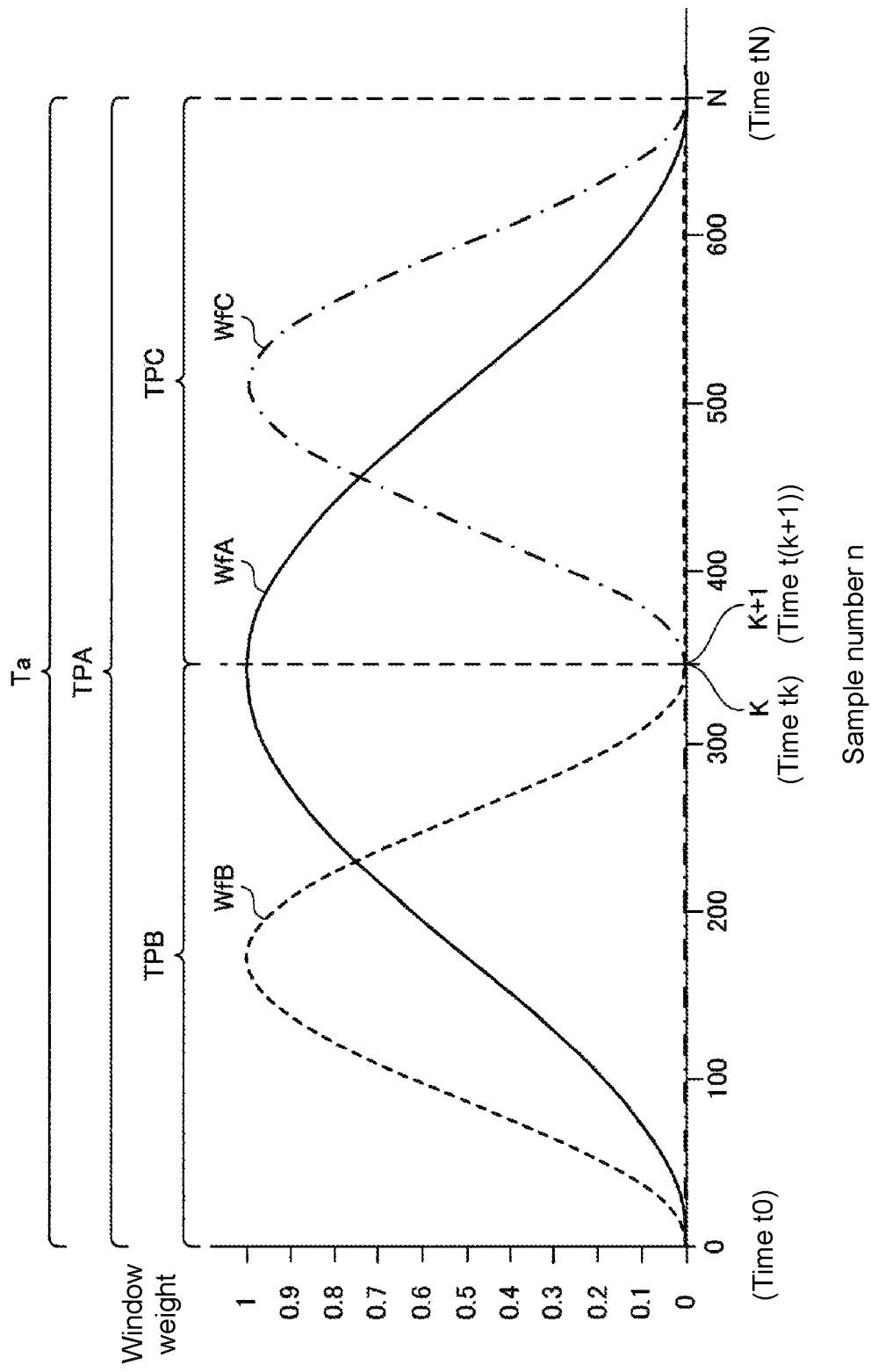
FIG. 6 illustrates an example of a window function used in a window function and FFT processor of a signal processor according to an embodiment of the disclosure.

FIG. 6 illustrates an example of a window function used in a window function and FFT processor of a signal processor according to an embodiment of the disclosure. In FIG. 6, the horizontal axis indicates the value of the sample number n of the beat signal SD(n), and the vertical axis indicates window weight of the window function Wf. As described above, the sample number n corresponds to the elapsed time from the start of the sweep period T. The solid line in FIG. 6 indicates the window function WfA used in the window function processing by the window function processor 31A. The broken line in FIG. 6 indicates the window function WfB used in the window function processing by the window function processor 31B. The chain line in FIG. 6 indicates the window function WfC used in the window function processing by the window function processor 31C.

Referring to FIG. 6, a pass time domain TPA being the pass time domain TP of the window function WfA indicates the time from time t0 corresponding to the sample number n=zero to time tN corresponding to the sample number n=N. A pass time domain TPB being the pass time domain TP of the window function WfB indicates the time from time t0 corresponding to the sample number n=zero to time tk corresponding to the sample number n=k. A pass time domain TPC being the pass time domain TP of the window function WfC indicates the time from time t(k+1) corresponding to the sample number n=(k+1) to time tN corresponding to the sample number n=N. Here, k is an integer equal to or greater than 2 and less than N, and is, for example, an integer closest to N/2. That is, the pass time domains TPA, TPB, and TPC respectively correspond to a time domain of the whole target time domain Ta, a time domain of the first half of the target time domain Ta, and a time domain of the latter half of the target time domain Ta. For example, multiple window functions Wf include those having the same shape design. In the example shown in FIG. 6, the window function WfB and the window function WfC have the same shape in the pass time domains TPB and TPC. The shapes of the window functions WfA, WfB, and WfC are not limited to the shapes shown in FIG. 6 and may be any other shape.

For example, the extracted signal generator 31 may generate multiple extracted beat signals E extracted based on a temporally continuous time range. That is, the extracted signal generator 31 may generate multiple extracted beat signals E respectively based on the beat signals SD(n) in multiple time ranges that are temporally continuous. More specifically, the pass time domain TPB being the time from time t0 to time tk and the pass time domain TPC being the time from time t(k+1) to time tN are time domains that are temporally continuous in this order. The window function processors 31B and 31C may respectively multiply the beat signal SD(n) by the window functions WfB and WfC, thereby generating the extracted beat signals EB and EC respectively based on the beat signals SD(n) in multiple time ranges that are temporally continuous.

For example, the extracted signal generator 31 may generate, as one of the extracted beat signals E, the extracted beat signal E extracted based on a time range including multiple time ranges. That is, the extracted signal generator 31 may generate, as one of multiple extracted beat signals E, the extracted beat signal E based on the beat signal SD(n) of the target time domain Ta. More specifically, the pass time domain TPA is a time domain corresponding to the target time domain Ta. The window function processor 31A may multiply the beat signal SD(n) by the window function WfA, thereby generating the extracted beat signal EA based on the beat signal SD(n) of the target time domain Ta.

For example, while the pass time domain TPA and the pass time domain TPB include a time corresponding to the sample number n of 170 to 175, the pass time domain TPC does not include the time corresponding to the sample number n of 170 to 175. That is, while the extracted beat signals EA and EB include the I signal Si(n) and Q signal Sq(n) whose amplitude is replaced with zero, the extracted beat signal EC does not include the I signal Si(n) and Q signal Sq(n) whose amplitude is replaced with zero.

The window function processors 31A, 31B, and 31C may respectively output the generated extracted beat signals EA, EB, and EC to the FFT processors 32A, 32B, and 32C in the converter 32.

(Converter)

The converter 32 may convert multiple extracted beat signals E to amplitude data DS indicating a relationship between distance and amplitude. That is, the converter 32 may convert multiple extracted beat signals E being complex signals respectively to the amplitude data DS indicating a relationship between a distance d from the radar device 300 and an amplitude.

More specifically, the converter 32 may receive multiple extracted beat signals E from the extracted signal generator 31 and perform the FFT processing on the received extracted beat signals E, thereby generating a power spectrum P being a complex signal. Then, the converter 32 may perform processing configured to multiply a frequency in each power spectrum P generated for each extracted beat signal E by a coefficient C to convert the frequency to the distance d, or the like, thereby generating the amplitude data DS being a complex signal for each extracted beat signal E.

Specifically, the FFT processor 32A may receive the extracted beat signal EA from the window function processor 31A and perform the FFT processing on the received extracted beat signal EA, thereby generating a power spectrum PA. Then, the FFT processor 32A may perform processing configured to multiply a frequency in the generated power spectrum PA by the coefficient C to convert the frequency to the distance d, thereby generating amplitude data DSA indicating the relationship between the distance d and the amplitude.

The FFT processor 32B may receive the extracted beat signal EB from the window function processor 31B and perform the FFT processing on the received extracted beat signal EB, thereby generating a power spectrum PB. Then, the FFT processor 32B may perform processing configured to multiply a frequency in the generated power spectrum PB by the coefficient C to convert the frequency to the distance d, and double each of I data and Q data in the power spectrum PB, thereby generating amplitude data DSB indicating the relationship between the distance d and the amplitude. Here, since the pass time domain TPB of the window function WfB is ½ of the pass time domain TPA of the window function WfA, the output of the power spectrum PB is ½ of that of the power spectrum PA. Therefore, in order to compensate for a ratio of the power spectrum P generated by a ratio of the pass time domain TP of the window function Wf, the FFT processor 32B may perform the processing configured to double each of the I data and Q data in the power spectrum PB. For example, in the case where the pass time domain TPB of the window function WfB is 1/K of the pass time domain TPA of the window function WfA, in order to compensate for a ratio of the output of the power spectrum PB to the power spectrum PA, the FFT processor 32B may perform processing configured to multiply each of the I data and Q data in the power spectrum PB by K.

The FFT processor 32C may receive the extracted beat signal EC from the window function processor 31C and perform the FFT processing on the received extracted beat signal EC, thereby generating a power spectrum PC. Then, the FFT processor 32C may perform processing configured to multiply a frequency in the generated power spectrum PC by the coefficient C to convert the frequency to the distance d, and double each of the I data and Q data in the power spectrum PC similarly to the FFT processor 32B, thereby generating amplitude data DSC indicating the relationship between the distance d and the amplitude.

Figure 7:
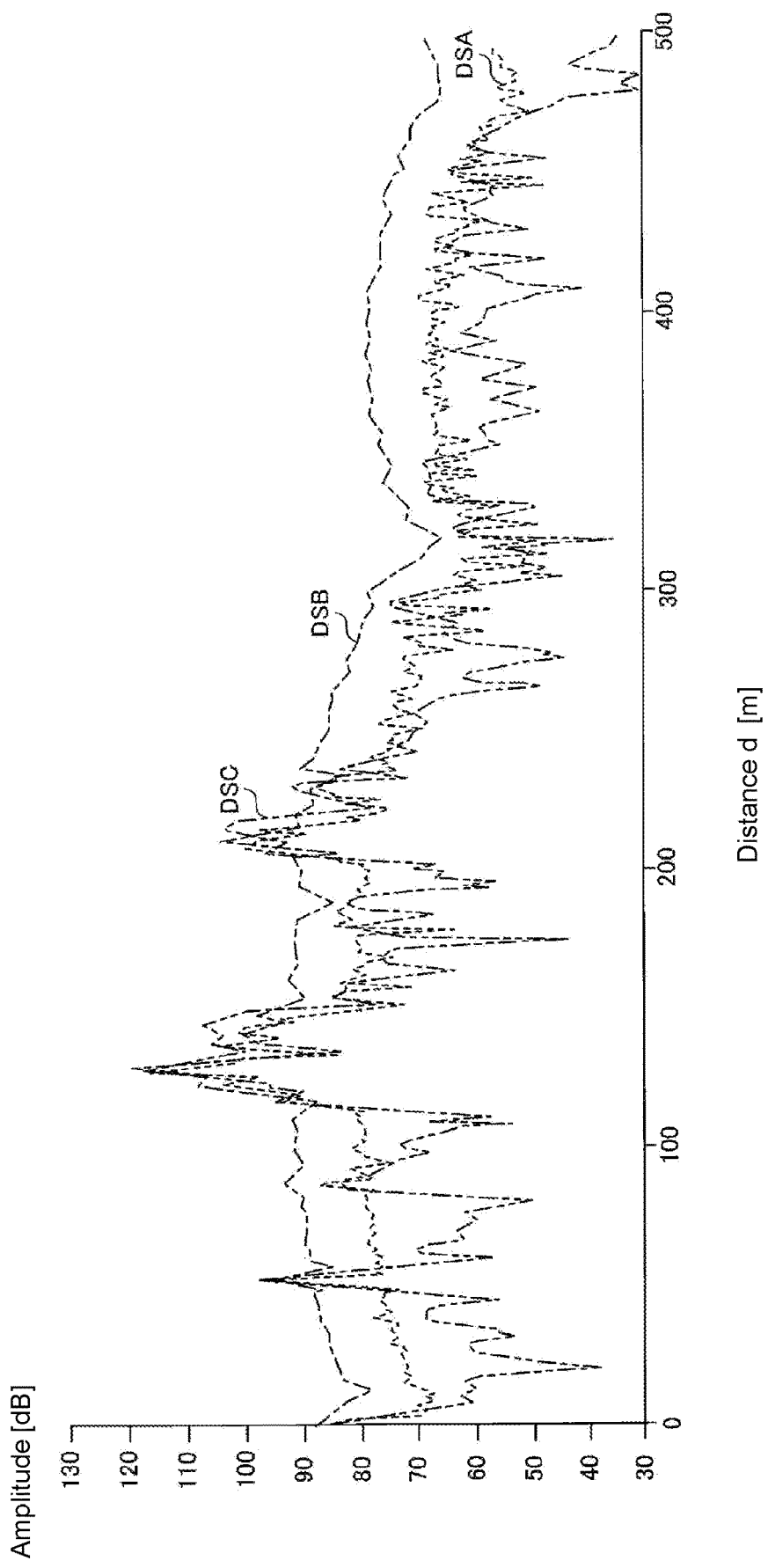
FIG. 7 illustrates an example of amplitude data generated in a window function and FFT processor of a signal processor according to an embodiment of the disclosure.

FIG. 7 illustrates an example of amplitude data generated in a window function and FFT processor of a signal processor according to an embodiment of the disclosure. In FIG. 7, the horizontal axis indicates distance d [m] and the vertical axis indicates amplitude [dB]. The broken line in FIG. 7 indicates an amplitude Xa of the amplitude data DSA. The chain line in FIG. 7 indicates an amplitude Xb of the amplitude data DSB. The chain double-dashed line in FIG. 7 indicates an amplitude Xc of the amplitude data DSC.

Referring to FIG. 7, the amplitude data DSC has a smaller range side lobe than the amplitude data DSA and DSB. The reason is that as described above, while the extracted beat signals EA and EB include the I signal Si(n) and Q signal Sq(n) whose amplitude is replaced with zero, the extracted beat signal EC does not include the I signal Si(n) and Q signal Sq(n) whose amplitude is replaced with zero.

The FFT processors 32A, 32B, and 32C may respectively output the generated amplitude data DSA, DSB, and DSC to the integrated data generator 33.

(Integrated Data Generator)

The integrated data generator 33 may generate integrated data in which multiple amplitude data are integrated. More specifically, based on the amplitude for each distance d in the amplitude data DSA, DSB, and DSC, the integrated data generator 33 may generate the integrated data DI indicating the relationship between the distance d and the amplitude.

For example, the integrated data generator 33 may generate the integrated data DI by selecting the amplitude of any one of the amplitude data DSA, DSB, and DSC for each distance d. As an example, the integrated data generator 33 may take the minimum value of the amplitude data DSA, DSB, and DSC, thereby generating the integrated data DI being a set of minimum values of the amplitude of the amplitude data DSA, DSB, and DSC.

More specifically, the integrated data generator 33 may calculate an amplitude absolute value ampA(d) for each distance d of the amplitude data DSA, represented by the following Equation (1), an amplitude absolute value ampB(d) for each distance d of the amplitude data DSB, represented by the following Equation (2), and an amplitude absolute value ampC(d) for each distance d of the amplitude data DSC, represented by the following Equation (3).

$$\mathrm{amp}A(d) = (Ia)^2 + (Qa)^2 \quad (1)$$

$$\mathrm{amp}B(d) = (Ib)^2 + (Qb)^2 \quad (2)$$

$$\mathrm{amp}C(d) = (Ic)^2 + (Qc)^2 \quad (3)$$

Here, $(Ia)^2+(Qa)^2$ is the sum of the square of the I data in the amplitude data DSA and the square of the Q data in the amplitude data DSA. $(Ib)^2+(Qb)^2$ is the sum of the square of the I data in the amplitude data DSB and the square of the Q data in the amplitude data DSB. $(Ic)^2+(Qc)^2$ is the sum of the square of the I data in the amplitude data DSC and the square of the Q data in the amplitude data DSC.

The integrated data generator 33 may select the minimum value of the amplitude absolute values ampA(d), ampB(d), and ampC(d) for each distance d. Hereinafter, the distance d when the minimum value of the amplitude absolute values ampA(d), ampB(d), and ampC(d) is the amplitude absolute value ampA(d) is defined as a distance da, the distance d when the minimum value of the amplitude absolute values ampA(d), ampB(d), and ampC(d) is the amplitude absolute value ampB(d) is defined as a distance db, and the distance d when the minimum value of the amplitude absolute values ampA(d), ampB(d), and ampC(d) is the amplitude absolute value ampC(d) is defined as a distance dc.

That is, the integrated data generator 33 may determine the distance d to be any one of the distances da, db, and dc based on a comparison result between the amplitude absolute values ampA(d), ampB(d), and ampC(d).

Then, the integrated data generator 33 may select an amplitude in the amplitude data DSA that corresponds to the distance da, an amplitude in the amplitude data DSB that corresponds to the distance db and an amplitude in the amplitude data DSC that corresponds to the distance dc, and generate the integrated data DI including the selected amplitudes.

Figure 8:
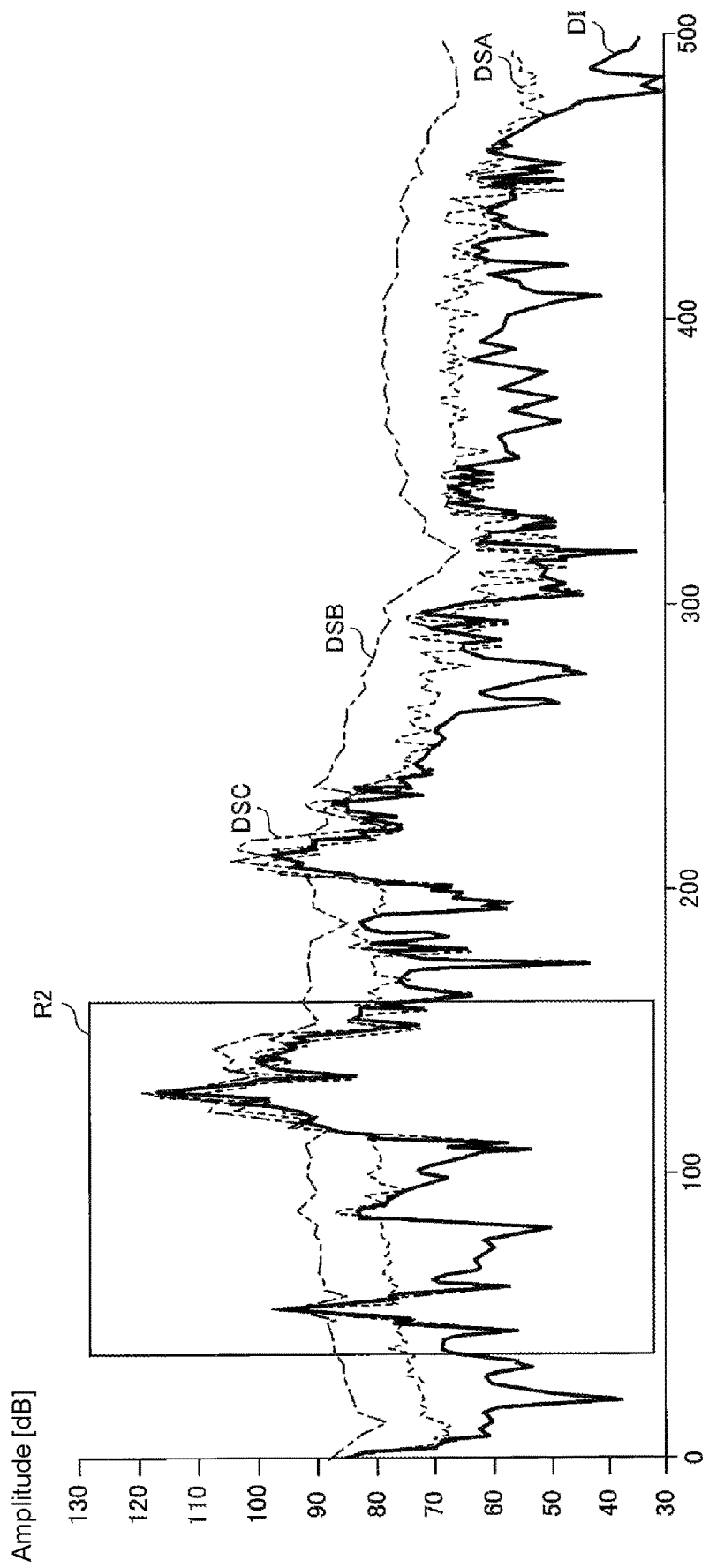
FIG. 8 illustrates an example of integrated data generated in a window function and FFT processor of a signal processor according to an embodiment of the disclosure.
Figure 9:
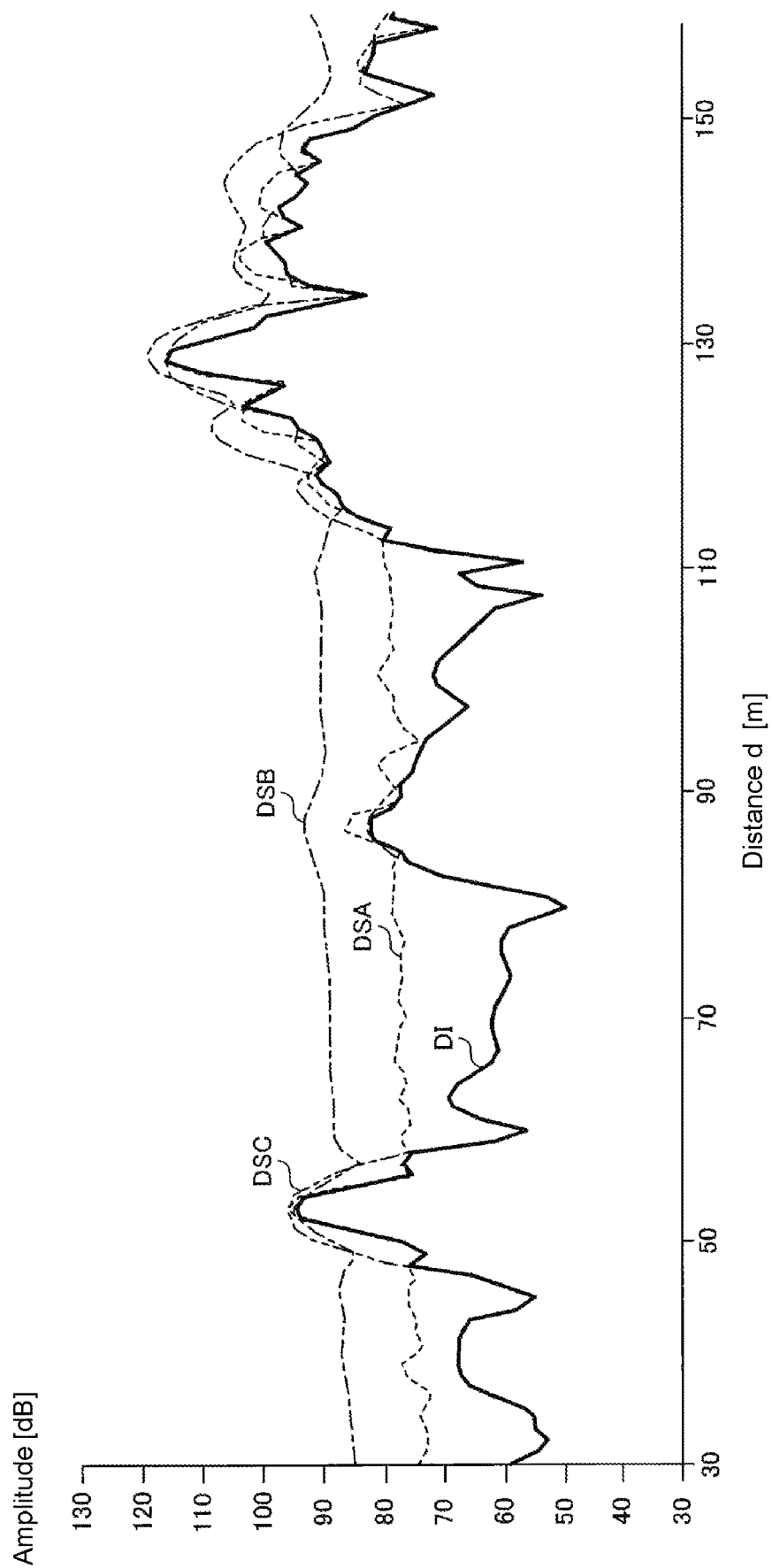
FIG. 9 illustrates an example of integrated data generated in a window function and FFT processor of a signal processor according to an embodiment of the disclosure.

FIG. 8 and FIG. 9 illustrate an example of integrated data generated in a window function and FFT processor of a signal processor according to an embodiment of the disclosure. FIG. 9 is an enlarged view of a region R2 in FIG. 8. In FIG. 8 and FIG. 9, the horizontal axis indicates distance d

[m] and the vertical axis indicates amplitude [dB]. The solid line in FIG. 8 and FIG. 9 indicates amplitude of the integrated data DI. The broken line in FIG. 8 and FIG. 9 indicates amplitude of the amplitude data DSA. The chain line in FIG. 8 and FIG. 9 indicates amplitude of the amplitude data DSB. The chain double-dashed line in FIG. 8 and FIG. 9 indicates amplitude of the amplitude data DSC.

Referring to FIG. 8 and FIG. 9, the integrated data generator 33 may generate the integrated data DI being a set of minimum values of the amplitude of the amplitude data DSA, the amplitude of the amplitude data DSB, and the amplitude of the amplitude data DSC.

The integrated data generator 33 may output the generated integrated data DI to the absolute value to logarithmic converter 40.

Figure 10:
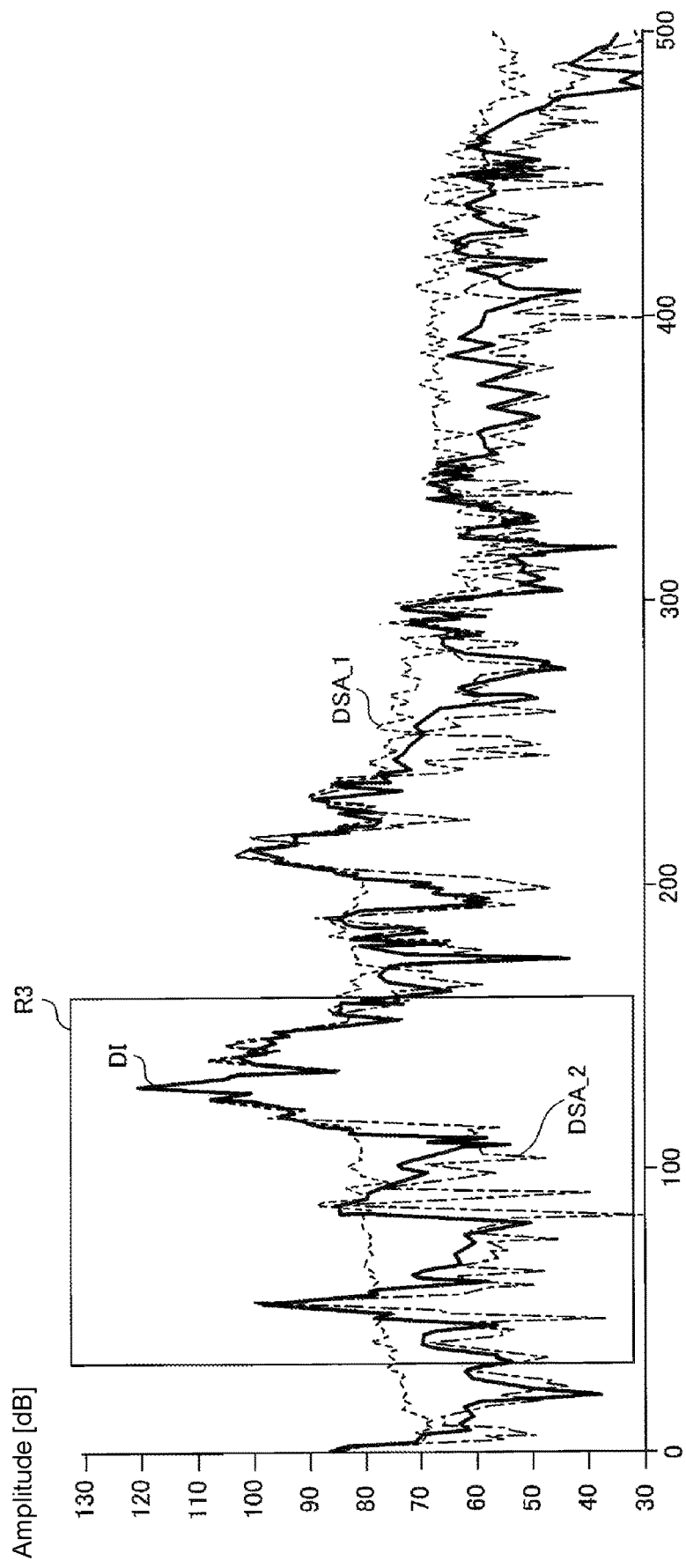
FIG. 10 illustrates an example of integrated data generated in a window function and FFT processor of a signal processor according to an embodiment of the disclosure.
Figure 11:
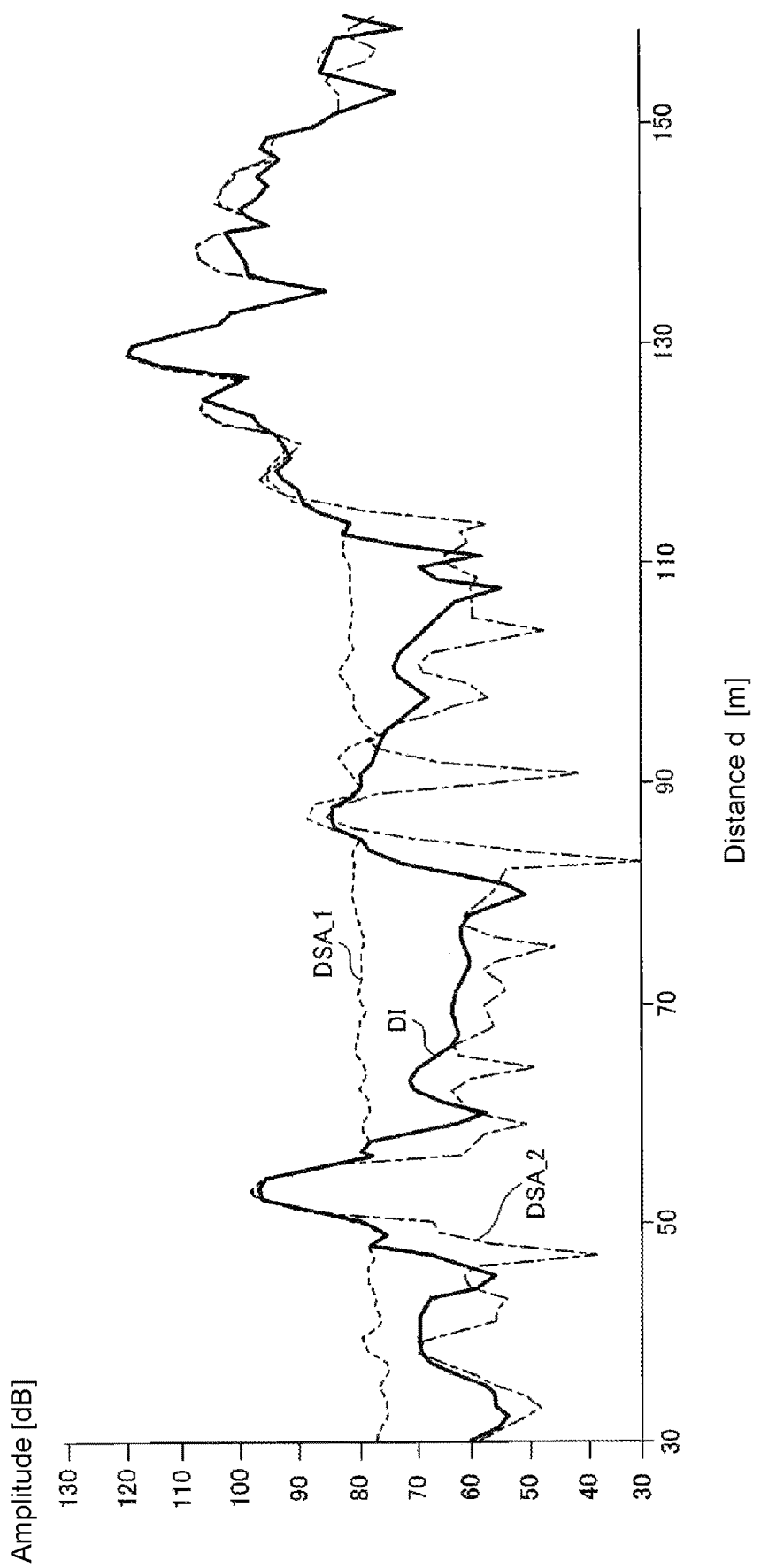
FIG. 11 illustrates an example of integrated data generated in a window function and FFT processor of a signal processor according to an embodiment of the disclosure.

FIG. 10 and FIG. 11 illustrate an example of integrated data generated in a window function and FFT processor of a signal processor according to an embodiment of the disclosure. FIG. 10 is an enlarged view of a region R3 in FIG. 11. In FIG. 10 and FIG. 11, the horizontal axis indicates distance d [m] and the vertical axis indicates amplitude [dB]. The solid line in FIG. 10 and FIG. 11 indicates amplitude of the integrated data DI. The broken line in FIG. 10 and FIG. 11 indicates amplitude data DSA_1 generated by performing the FFT processing or the like on the extracted beat signal EA based on the beat signal SD(n) in which interference is mixed and a domain thereof is replaced with zero. The chain line in FIG. 10 and FIG. 11 indicates amplitude data DSA_2 generated by performing the FFT processing or the like on the extracted beat signal EA based on an ideal beat signal SD(n) in which no interference is mixed and no domain is replaced with zero.

Referring to FIG. 10 and FIG. 11, the amplitude data DSA_1 generated based on the beat signal SD(n) from which the interference component has been removed has a larger range side lobe than the amplitude data DSA_2. On the other hand, the integrated data DI has the same peak shape as the amplitude data DSA_1 and DSA_2, and has a smaller range side lobe than the amplitude data DSA_1. Therefore, in the radar device 100 according to an embodiment of the disclosure, based on the beat signal SD(n) from which the interference component has been removed, the integrated data DI can be generated having a small range side lobe while maintaining the same peak shape as the ideal beat signal having no interference mixing therein. Thus, a target can be relatively accurately detected based on the integrated data DI.

[Operation Flow]

A radar device according to an embodiment of the disclosure includes a computer including a memory. An arithmetic processor such as a CPU in the computer may read from the memory a program including some or all of steps of the following flowchart and sequence and execute the same. The program can be installed from the outside. The program is stored in a recording medium or distributed via a communication line.

Figure 12:
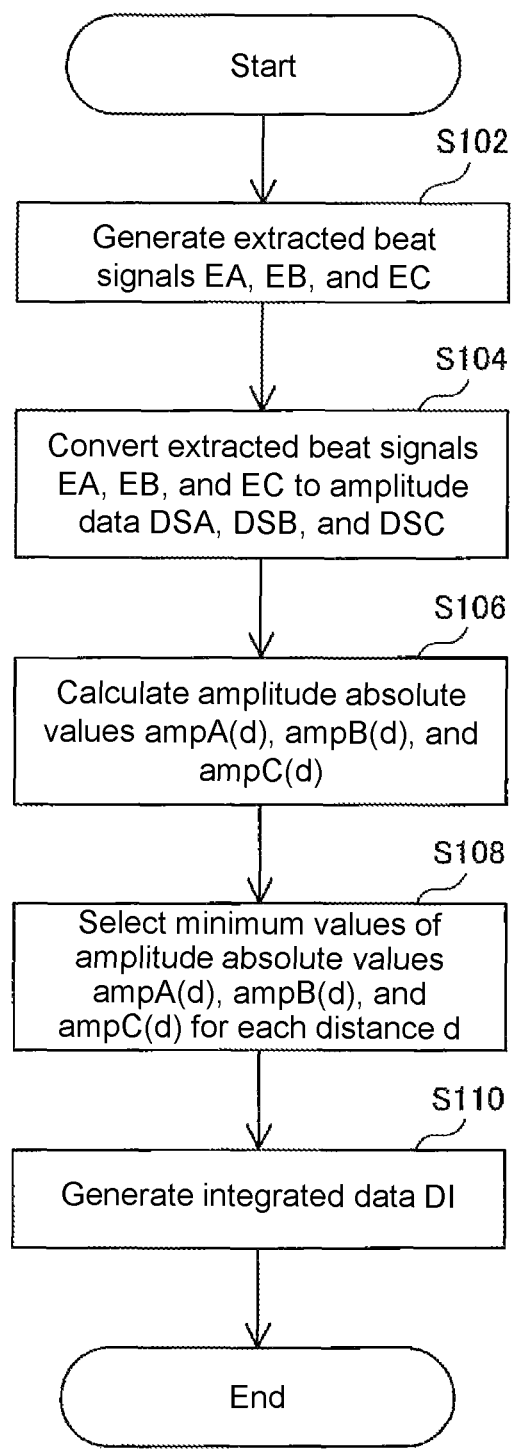
FIG. 12 is a flowchart defining an example of an operation procedure when a radar device according to an embodiment of the disclosure generates integrated data.

FIG. 12 is a flowchart defining an example of an operation procedure when a radar device according to an embodiment of the disclosure generates integrated data.

Referring to FIG. 12, firstly, the radar device 300 may multiply the beat signal SD(n) by the window functions WfA, WfB, and WfC, respectively, thereby generating the beat signals EA, EB, and EC (step S102).

Next, the radar device 300 may perform the FFT processing or the like on the extracted beat signals EA, EB, and EC, thereby converting the extracted data signals EA, EB, and EC to the amplitude data DSA, DSB, and DSC (step S104).

Next, the radar device 300 may calculate the amplitude absolute value ampA(d) for each distance d of the amplitude data DSA, the amplitude absolute value ampB(d) for each distanced of the amplitude data DSB, and the amplitude absolute value ampC(d) for each distance d of the amplitude data DSC (step S106).

Next, the radar device 300 may select the minimum value of the amplitude absolute values ampA(d), ampB(d), and ampC(d) for each distance d, thereby distributing the distance d to any of the distances da, db, and dc (step S108).

Next, the radar device 300 may generate the integrated data DI including the amplitude in the amplitude data DSA that corresponds to the distance da, the amplitude in the amplitude data DSB that corresponds to the distance db and the amplitude in the amplitude data DSC that corresponds to the distance dc (step S110).

In the signal processor 100 according to an embodiment of the disclosure, the extracted signal generator 31 is configured to generate the extracted beat signals EA, EB, and EC by multiplying the beat signal SD(n) by the window functions WfA, WfB, and WfC having different time domains serving as pass bands. However, the disclosure is not limited thereto. The extracted signal generator 31 may be configured to generate the extracted beat signals EA, EB, and EC being beat signals SD(n) in multiple time ranges different from each other by extraction of some or all the beat signals SD(n) without use of the window functions WfA, WfB, and WfC.

In the signal processor 100 according to an embodiment of the disclosure, the extracted signal generator 31 is configured to generate the extracted beat signals EB and EC respectively based on the beat signals SD(n) in multiple time ranges that are temporally continuous. However, the disclosure is not limited thereto. The extracted signal generator 31 may be configured to generate the extracted beat signals EB and EC respectively based on the beat signals SD(n) in multiple time ranges that partially overlap. That is, the pass time domains TPB and TPC may temporally overlap. However, since the extracted signal generator 31 is configured to generate the extracted beat signals EB and EC respectively based on the beat signals SD(n) in multiple time ranges that are temporally continuous, it is possible to prevent that the same I signal Si(n) and Q signal Sq(n) whose amplitude is replaced with zero in the interference remover 20 are included in both the extracted beat signals EB and EC.

In the signal processor 100 according to an embodiment of the disclosure, the extracted signal generator 31 is configured to generate the extracted beat signal EA based on the beat signal SD(n) of the target time domain Ta. However, the disclosure is not limited thereto. The extracted signal generator 31 may be configured to generate the extracted beat signals EB and EC, but not to generate the extracted beat signal EA. That is, the extracted signal generator 31 may be configured not to include the window function processor 31A.

In the signal processor 100 according to an embodiment of the disclosure, the extracted signal generator 31 is configured to generate the extracted beat signals EA, EB, and EC. However, the disclosure is not limited thereto. The extracted signal generator 31 may be configured to generate two or four or more extracted beat signals E. For example, the extracted signal generator 31 may be configured to generate M extracted beat signals E respectively based on the beat signals SD(n) in M time ranges that are different from each other by dividing the target time domain Ta by M. That is, the extracted signal generator 31 may be configured to include M window function processors that respectively generate the beat signals E by respectively multiplying the beat signal SD(n) by M window functions Wf having different pass time domains TP from each other. Here, M is an integer equal to or greater than 2. Even if the beat signal SD(n) includes more interference waves as M increases, the integrated data DI having a relatively small range side lobe can be generated. On the other hand, the smaller M is, the simpler the configuration of the window function and FFT processor 30 can be.

In the signal processor 100 according to an embodiment of the disclosure, the integrated data generator 33 is configured to generate the integrated data DI being a set of minimum values of the amplitude of the amplitude data DSA, DSB, and DSC. However, the disclosure is not limited thereto. The integrated data generator 33 may be configured to generate the integrated data DI by performing arithmetic processing such as calculation of an average value for the amplitude of the amplitude data DSA, DSB, and DSC.

By the way, there is a desire for a technique capable of relatively accurately detecting a target based on a beat signal.

For example, the radar system described in Patent Document 1 is configured to include a signal processing path for removing interference waves from the beat signal and a signal processing path for not removing interference waves from the beat signal. In such a configuration, a range side lobe in a power spectrum generated based on the beat signal may increase, and a target may not be able to be accurately detected.

In contrast, in the signal processor 100 according to an embodiment of the disclosure, the extracted signal generator 31 generates the extracted beat signals EA, EB, and EC extracted based on multiple different time ranges from a processing signal generated based on a beat signal of a transmission signal and a reception signal. The converter 32 converts the extracted beat signals EA, EB, and EC to the amplitude data DSA, DSB, and DSC indicating the relationship between the distance d and the amplitude. The integrated data generator 33 generates the integrated data DI in which the amplitude data DSA, DSB, and DSC are integrated.

In this way, by the configuration to generate the extracted beat signals EA, EB, and EC extracted based on multiple different time ranges from the processing signal based on the beat signal, convert the extracted beat signals EA, EB, and EC respectively to the amplitude data DSA, DSB, and DSC, and generate the integrated data DI in which multiple amplitude data DSA, DSB, and DSC are integrated, the integrated data DI can be generated using the amplitude data DSC based on the extracted beat signal EC that does not include the beat signal SD(n) whose amplitude is replaced with zero in order to remove, for example, the interference component. Thus, an increase in range side lobe in the integrated data DI due to the amplitude of some beat signals SD(n) being replaced with zero can be suppressed, and the target can be relatively accurately detected based on the integrated data DI having a small range side lobe. Therefore, the target can be relatively accurately detected based on the beat signal SD(n).

In the signal processor 100 according to an embodiment of the disclosure, the extracted signal generator 31 generates the extracted beat signals EA, EB, and EC from the processing signal by multiplying multiple window functions different in pass time domain.

By such a configuration, for example, by performing a Fourier transform on the extracted beat signals EA, EB, and EC generated by using an appropriate window function, the amplitude data DSA, DSB, and DSC having relatively small error can be generated.

In the signal processor 100 according to an embodiment of the disclosure, the integrated data generator 33 generates the integrated data DI by selecting the amplitude of any one of the amplitude data DSA, DSB, and DSC for each distance d.

By such a configuration, for example, the amplitude data DS having a smallest range side lobe can be selectively used and the integrated data DI having a relatively small range side lobe can be easily generated.

In the signal processor 100 according to an embodiment of the disclosure, the extracted signal generator 31 generates the extracted signal signals EB and EC extracted based on a temporally continuous time range.

By such a configuration, it can be suppressed that one beat signal SD(n) whose amplitude is replaced with zero in order to remove, for example, the interference component, is included in both the extracted beat signals EB and EC. Thus, in at least one of the amplitude data DSB and DSC based on the extracted beat signals EB and EC, an increase in range side lobe due to the amplitude of the beat signal SD(n) being replaced with zero can be suppressed.

In the signal processor 100 according to an embodiment of the disclosure, the extracted signal generator 31 generates, as one of the extracted beat signal E, the extracted beat signal EA extracted based on a time range including multiple time ranges.

By such a configuration, the amplitude data DSA having a relatively high range resolution can be generated based on the extracted beat signal EA based on the beat signal SD(n) having a relatively large sample number. Thus, the integrated data DI having a relatively high range resolution can be generated using the amplitude data DSA.

In the signal processor 100 according to an embodiment of the disclosure, the window function includes those having the same shape design.

By such a configuration, there is no need to perform correction processing or the like on the extracted beat signal according to a difference in the shape of the window function, and the integrated data DI can be generated by a simple configuration and processing.

The radar device 300 according to an embodiment of the disclosure includes the signal processor 100, the transmitter 120, and the receiver 150. The transmitter 120 transmits the transmission signal. The receiver 150 receives the reflected signal obtained by reflecting the transmitted transmission signal by the target.

By such a configuration, the radar device 300 that relatively accurately detects the target based on the beat signal SD(n) can be realized.

In the radar device 300 according to an embodiment of the disclosure, the transmitter 120 transmits the transmission signal via the rotating transmitting antenna 130. The receiver 150 receives the reflected signal via the rotating receiving antenna 140.

By such a configuration, the transmission signal can be transmitted and the reflected signal can be received in various directions. Thus, the target can be detected in a relatively wide range.

A radar signal processing method according to an embodiment of the disclosure is a radar signal processing method in the signal processor 100 used in the radar device 300. In the radar signal processing method, firstly, the signal processor 100 may generate the extracted beat signals EA, EB, and EC extracted based on multiple different time ranges from the processing signal generated based on the beat signal of the transmission signal and the reception signal. Next, the signal processor 100 may convert the extracted beat signals EA, EB, and EC to the amplitude data indicating the relationship between the distance d and the amplitude. Next, the signal processor 100 may generate the integrated data DI in which the amplitude data DSA, DSB, and DSC are integrated.

In this way, by the method for generating the extracted beat signals EA, EB, and EC extracted based on multiple different time ranges from the processing signal based on the beat signal, converting the extracted beat signals EA, EB, and EC respectively to the amplitude data DSA, DSB, and DSC, and generating the integrated data DI in which multiple amplitude data DSA, DSB, and DSC are integrated, the integrated data DI can be generated using the amplitude data DSC based on the extracted beat signal EC that does not include the beat signal SD(n) whose amplitude is replaced with zero in order to remove, for example, the interference component. Thus, an increase in range side lobe in the integrated data DI due to the amplitude of some beat signals SD(n) being replaced with zero can be suppressed, and the target can be relatively accurately detected based on the integrated data DI having a small range side lobe. Therefore, the target can be relatively accurately detected based on the beat signal SD(n).

The above embodiments are examples in all aspects and should not be interpreted as limitations. The scope of the disclosure is defined by claims instead of the above descriptions, and it is intended to include all modifications within the scope of the claims and the equivalents thereof.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A radar signal processing device comprising:
   processing circuitry configured to:
   generate a processing signal based on a beat signal of a transmission signal and a reception signal,
   generate a plurality of extracted beat signals by applying a plurality of window functions on the processing signal,
   convert the plurality of extracted beat signals to amplitude data indicating a relationship between a distance and an amplitude, and
   integrate a plurality of the amplitude data into integrated data, wherein
      a first window function and a second window function of the plurality of window functions do not overlap in time,
      a third window function of the plurality of window functions overlaps at least one of the first window function and the second window function,
      peaks of window weights of the first window function, the second window function, and the third window function are at different times, and
      the peak of the window weight of the third window function is between the peaks of window weights of the first window function and the second window function.

2. The radar signal processing device according to claim 1, wherein the processing circuitry is further configured to select the amplitude of one of the plurality of amplitude data for each of the distance into the integrated data.

3. The radar signal processing device according to claim 1, wherein the plurality of window functions have a same type.

4. The radar signal processing device according to claim 2, wherein the plurality of window functions have a same type.

5. A radar device comprising:
   the radar signal processing device according to claim 1;
   a transmitter configured to transmit the transmission signal; and
   a receiver configured to receive a reflected signal reflected by a target.

6. A radar device comprising:
   the radar signal processing device according to claim 2;
   a transmitter configured to transmit the transmission signal; and
   a receiver configured to receive a reflected signal reflected by a target.

7. A radar signal processing method comprising:
   generating a processing signal based on a beat signal of a transmission signal and a reception signal,
   generating a plurality of extracted beat signals by applying a plurality of window functions on the processing signal,
   converting the plurality of extracted beat signals to amplitude data indicating a relationship between a distance and an amplitude, and
   integrating a plurality of the amplitude data into integrated data, wherein
      a first window function and a second window function of the plurality of window functions do not overlap in time,
      a third window function of the plurality of window functions overlaps at least one of the first window function and the second window function,
      peaks of window weights of the first window function, the second window function, and the third window function are at different times, and
      the peak of the window weight of the third window function is between the peaks of window weights of the first window function and the second window function.

8. A non-transitory computer-readable medium having stored thereon computer-executable instructions which, when executed by a computer, cause the computer to:
- generate a processing signal based on a beat signal of a transmission signal and a reception signal,
- generate a plurality of extracted beat signals by applying a plurality of window functions on the processing signal,
- convert the plurality of extracted beat signals to amplitude data indicating a relationship between a distance and an amplitude, and
- integrate a plurality of the amplitude data into integrated data, wherein
    - a first window function and a second window function of the plurality of window functions do not overlap in time,
    - a third window function of the plurality of window functions overlaps at least one of the first window function and the second window function,
    - peaks of window weights of the first window function, the second window function, and the third window function are at different times, and
    - the peak of the window weight of the third window function is between the peaks of window weights of the first window function and the second window function.

9. The radar signal processing device of claim 1, wherein a pass time domain of the third window function is a sum of a pass time domain of the first window function and a pass time domain of the second window function.

10. The radar signal processing method of claim 7, wherein a pass time domain of the third window function is a sum of a pass time domain of the first window function and a pass time domain of the second window function.

11. The non-transitory computer-readable medium of claim 8, wherein a pass time domain of the third window function is a sum of a pass time domain of the first window function and a pass time domain of the second window function.

* * * * *